United States Patent [19]
del Rio

[11] 3,917,925
[45] Nov. 4, 1975

[54] EMBOSSED CHARACTER READER

[75] Inventor: Eddy Humberto del Rio, Palm Beach Gardens, Fla.

[73] Assignee: RCA Corporation, New York, N.Y.

[22] Filed: May 10, 1974

[21] Appl. No.: 468,931

[52] U.S. Cl............ 235/61.11 C; 178/17 B; 200/46
[51] Int. Cl. ... G06k 7/04; H04l 15/18; H01h 43/08
[58] Field of Search. 235/61.11 C, 61.11 A, 61.7 B; 200/46; 178/17 B; 340/259, 339

[56] References Cited
UNITED STATES PATENTS

| | | | |
|---|---|---|---|
| 3,424,879 | 1/1969 | Shlesinger, Jr. | 200/46 |
| 3,470,358 | 9/1969 | Sallach | 235/61.11 C |
| 3,708,654 | 1/1973 | Booth et al. | 235/61.11 A |
| 3,752,074 | 8/1973 | White et al. | 235/61.11 C |

*Primary Examiner*—Daryl W. Cook
*Attorney, Agent, or Firm*—Edward J. Norton; Carl V. Olson

[57] ABSTRACT

A record or credit card reader is disclosed for scanning and sequentially sensing a row of raised numbers represented in a stylized font such as the Farrington 7B character font. A cluster of seven electrical switches have sensing fingers arranged in a pattern to simultaneously sense the three possible horizontal segments and the four possible vertical segments of a number on a card passed under the fingers. A timing electrical switch has a sensing finger located in the path of the lower horizontal segment of the raised numbers, and has an offset trailing location to cause the timing switch to be operated at the moment when the seven sensing fingers are over seven respective possible segments of a number, and to then cause an electrical readout of the number.

7 Claims, 6 Drawing Figures

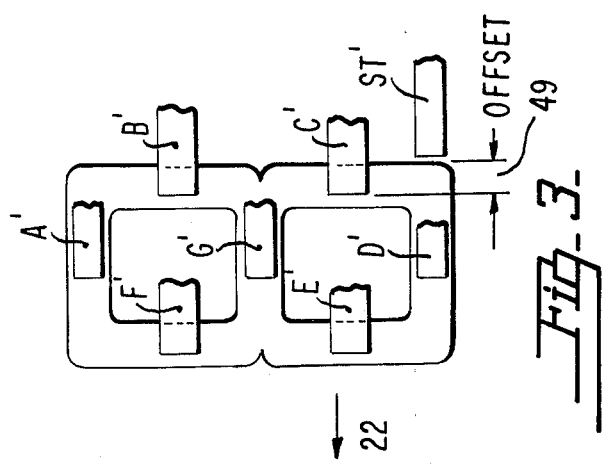
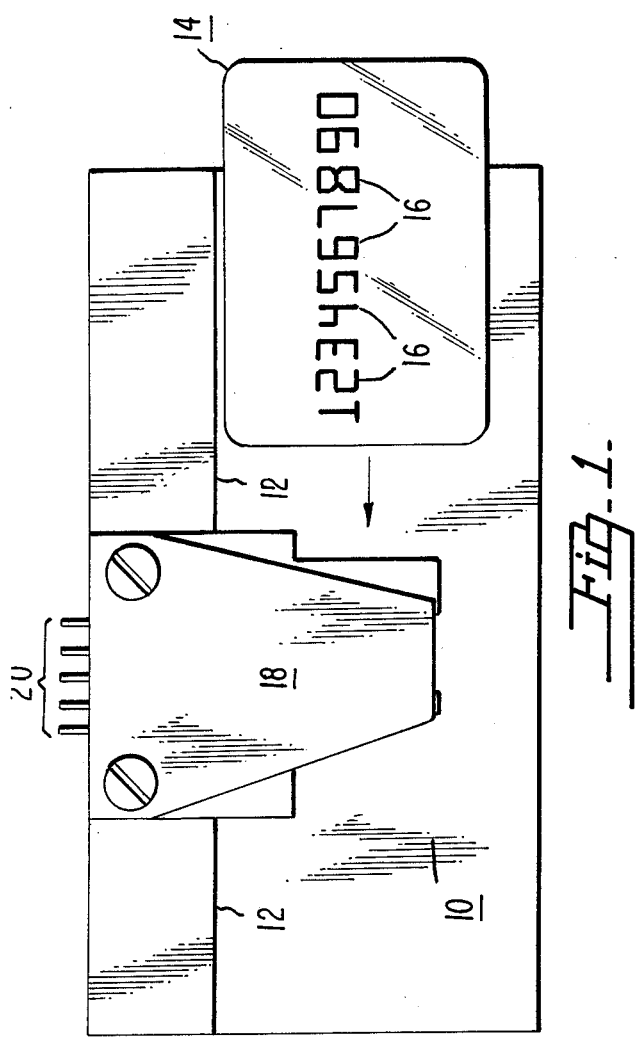
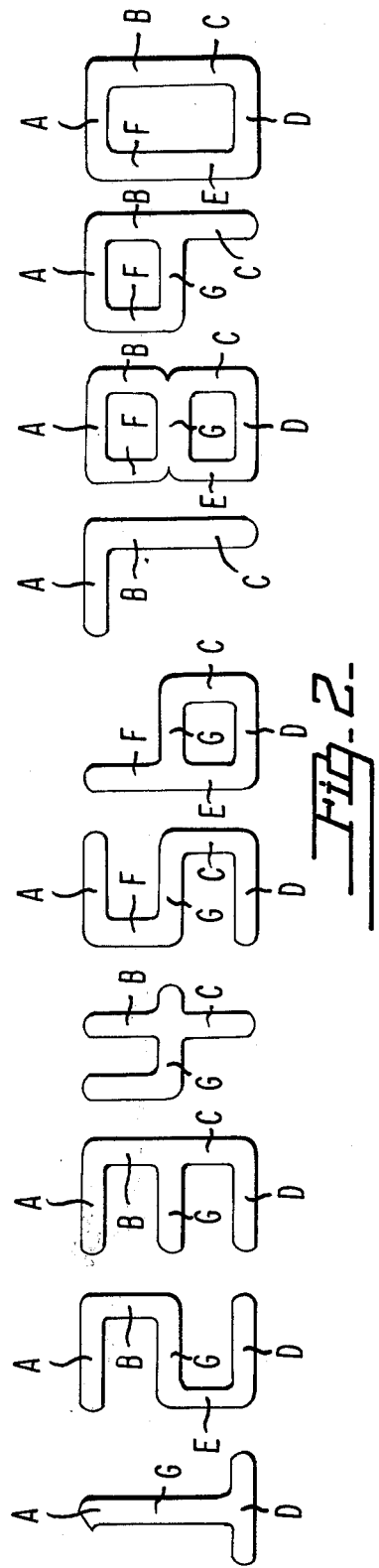

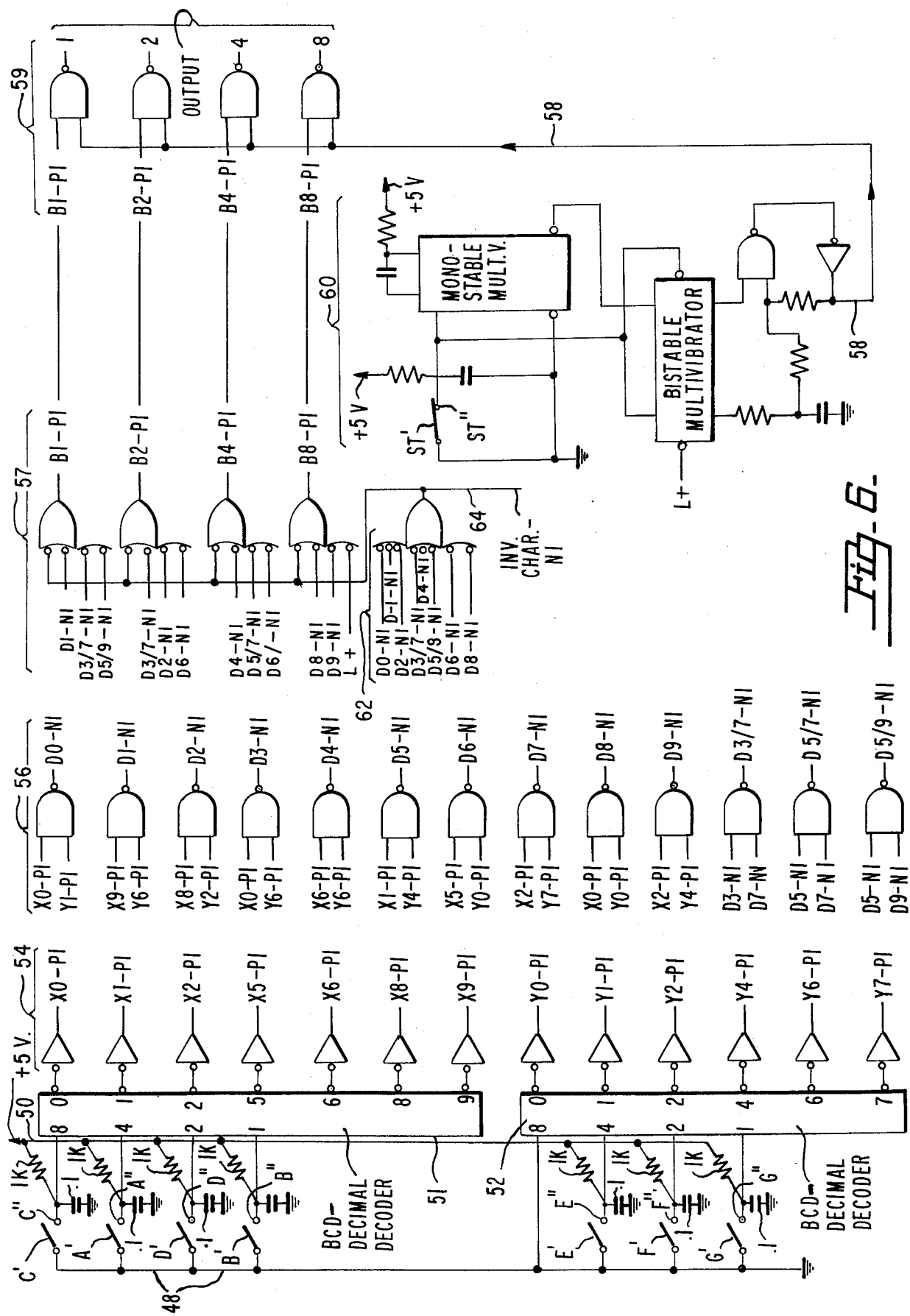

EMBOSSED CHARACTER READER

BACKGROUND OF THE INVENTION

Credit cards have come into widespread use for a wide variety of purchases by individuals. The credit card contains the name of the card-holder purchaser and an individual identifying several-digit number. The name and number are embossed on the card to frustrate attempts at alteration, and to permit a rapid printing at the point of sale of the name and number on a sales slip by means of a pressure sensitive material such as carbon paper. The name and number are thus made visible for reading by humans, and for subsequent reading by an optical character reader forming a part of an accounting machine system. However, there are proposed and existing systems where a computer terminal is located at the point of sale, and where it is necessary to immediately translate the embossed number on a credit card to electrical signals used for initiating the accounting procedure in an electrically connected accounting machine system. It is therefore useful for this application to have an economical record card reader for sequentially sensing a row of embossed numbers and for providing sequential, distinctively coded electrical output signals representing the embossed numbers.

SUMMARY OF THE INVENTION

A record card reader, for sequentially sensing a row of embossed characters on the card, includes a cluster of electrical switch spring fingers arranged in a pattern corresponding with respective possible segments in the characters. The card is moved relative to the spring fingers. A timing electrical switch spring finger is located in the path of a segment included in all of the embossed characters, and has a location to cause the timing switch to be operated at the moment when the cluster of electrical switch spring fingers is registered with the possible segments of a character. The timing switch controls the time of readout of the condition of the cluster of electrical switches to electrically represent an embossed character.

BRIEF DESCRIPTION OF THE DRAWING

FIG. 1 is a top view of a card reader for producing a series of electrical output signals representing a series of numeric characters embossed on a card passed through the reader;

FIG. 2 is a representation of the Farrington 7B numeric character font commonly used on embossed credit cards, and representations thereon of segments, designated A through G, of the characters;

FIG. 3 is a representation of a numeric character 8 having superimposed thereon the relative positions of a cluster of spring fingers used for sensing the presence or absence of respective segments of the numeric characters;

FIG. 6 is an electrical circuit diagram of means for translating the "on" or "off" switch positions resulting from a numeric character passed through the reader into binary coded decimal signals on four output conductors.

DESCRIPTION OF THE PREFERRED EMBODIMENT

Figure 4:
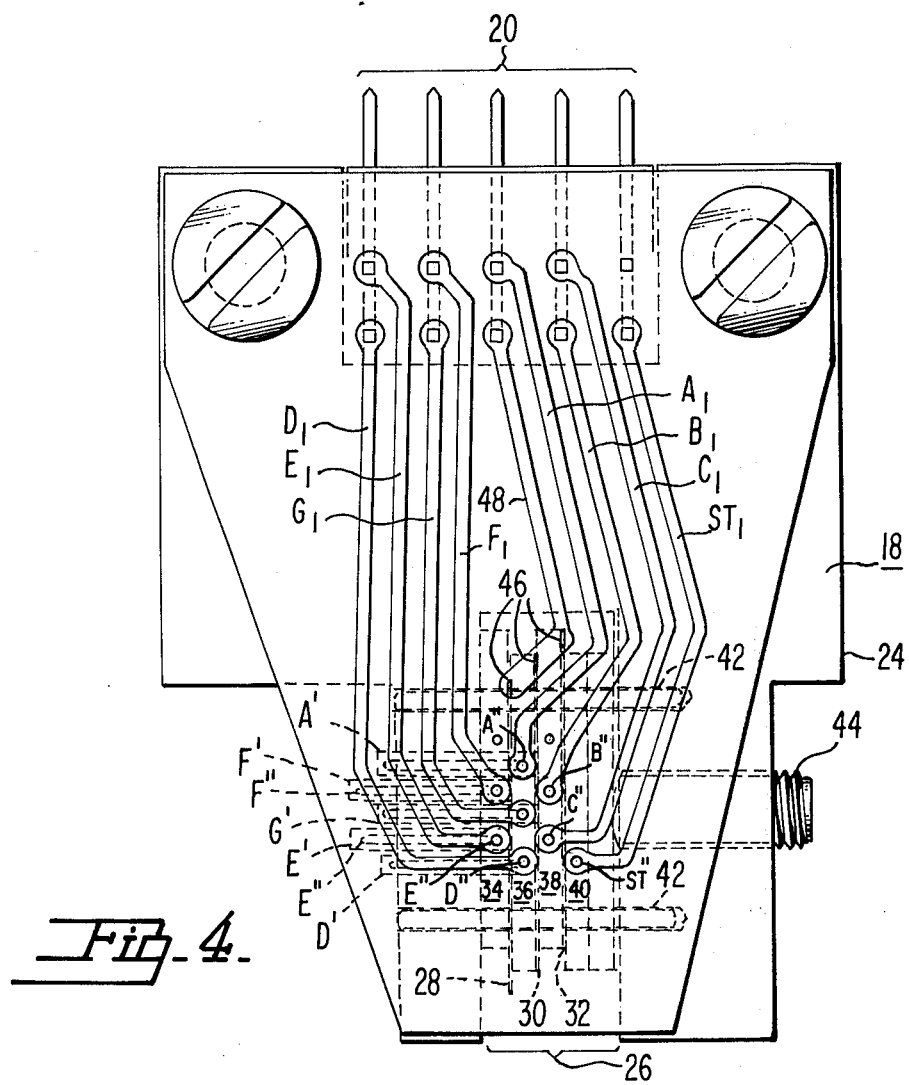
FIG. 4 is a top view in greater detail of a character sensing head shown in FIG. 1.

FIG. 1 shows a top view of an embossed-card reader constructed according to the teachings of the invention. A base surface 10 has a card edge guide 12 along which a credit card 14 is passed. The credit card 14 is shown as having embossed or raised numeric characters 16 thereon. An embossed character sensing head 18 is mounted above the surface 10, and it is provided with electrical switches having operating spring fingers which engage or scan the characters 16 as the card 14 is manually or mechanically passed from right to left underneath the head 18. The electrical switches in head 18 are connected to output conductors 20, and thence to decoding circuitry for translating the "on" and "off" switch conditions to electrical coded signals representing the numeric characters scanned.

FIG. 2 shows the Farrignton 7B numeric character font of numbers 0 through 9. The characters are seen to be made up of various combinations of seven segments which are labelled A through G on the numeric characters in FIG. 2.

FIG. 3 shows the relative positions of the sensing ends of a cluster of seven switch spring fingers A' through G' in relation to the seven segments of the number 8. In addition, the position of the sensing end of a strobe or timing switch spring finger ST' is also shown in relation to the seven spring fingers A' through G'. The switch spring fingers A' through G' and ST' are displaced by respective raised segments of an embossed numeric character as the card is passed in the direction 22 underneath the spring fingers. The precise time when the seven spring fingers are exactly registered with the seven segments of an embossed character, and thus the time when electrical sensing of the embossed character should be accomplished, is determined by the closing of a timing switch including the finger ST' as the lower base line segment of the raised character passes out from beneath the strobe or timing spring finger ST'.

Figure 5:
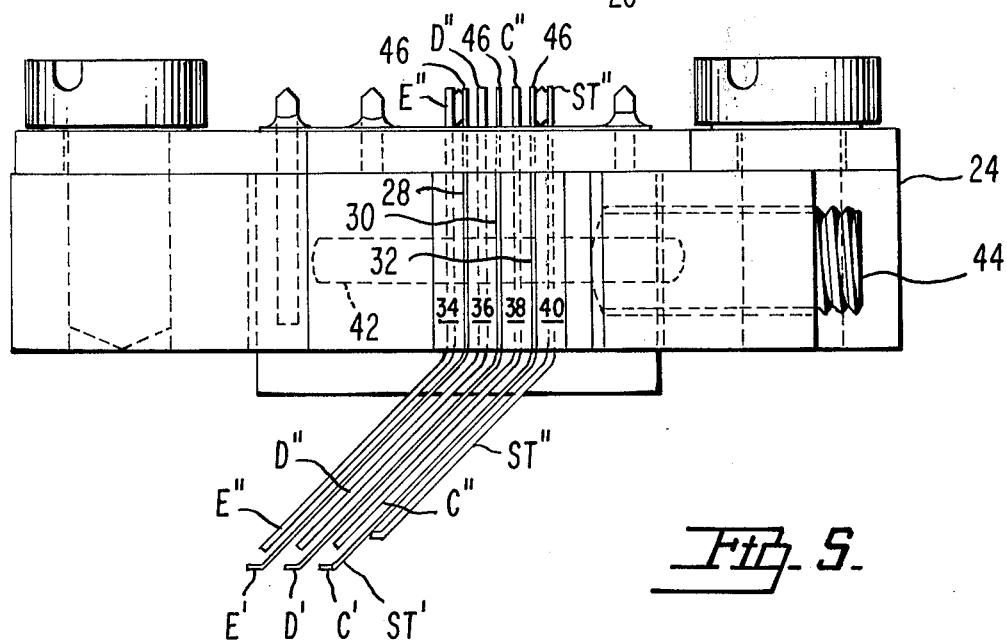
FIG. 5 is an elevation of the sensing head shown in FIG. 4.

Reference is now made to FIG. 4 and FIG. 5 for a description of the mechanical construction of the character sensing head 18. The head 18 has base member 24 which is cut out at 26 to receive a lamination or sandwich assembly of switch spring finger plates 28, 30 and 32, which are interleaved with switch wire supporting and insulating members 34, 36, 38 and 40. The laminations 28 through 40 are held in registry by guide holes and guide pins 42, and they are securely clamped in the notch 26 by means of a pressure screw 44.

The spring finger plate 28 includes individual spring fingers extending therefrom designated E' and F', as shown in FIGS. 3 and 4, for sensing character segments E and F. The spring finger plate 30 includes individual spring fingers A', G' and D' for character segments A, G and D. The spring finger plate 32 includes individual spring fingers B' and C' for segments B and C. The spring finger plate 32 additionally includes a spring finger ST' for strobing or timing purposes. The sensing ends of all spring fingers A' through G' and St' are relatively positioned as shown in FIG. 3. While the strobe or timing spring finger ST' lies in the same plane in FIGS. 4 and 5 as spring fingers B' and C', the strobe spring finger ST' is shorter than the other two fingers in that it does not have the angled foot which the other fingers are provided with. The sensing end of the strobe finger falls off the edge of an embossed character while the feet of spring fingers B' and C' are resting on the right hand vertical portion of the embossed character as a card 14 is passed under the head 18. The metallic plates 28, 30 and 32 from which the spring fingers extend are provided with lugs 46 by which a common ground return connection 48 is made.

Switch wire supporting member 34 supports switch wires E'' and F'' having lower ends positioned to be contacted by spring fingers E' and F', respectively, and having upper ends connected with printed circuit conductors $E_1$ and $F_1$. Insulating support member 36 similarly supports switch wires D'', G'' and A'' having lower ends in close proximity to corresponding spring fingers D', G' and A' and having upper ends connected to conductors $D_1$, $G_1$ and $A_1$. Insulating member 38 similarly supports switch wires C'' and B'' in cooperative relation with spring fingers C' and B', and with connections to conductors $C_1$ and $B_1$. Finally, the insulating member 40 supports a single strobe switch wire ST'' in cooperative relation with spring finger ST' and with a connection to conductor $ST_1$. The lower end of strobe wire ST'' is bent so that it normally makes contact with the spring finger ST', as shown in FIG. 5. The character segment sensing end of the spring finger ST' is seen to be shorter than the sensing ends of the other spring fingers C' and B', which lie in the same plane, by the amount of the angled feet on fingers C' and B'. This is the offset dimension 49 in FIG. 3.

Reference is now made to FIG. 6 for a description of an electronic circuit which is suitable for translating the operated conditions of switches A', A'' through G', G'' and ST', ST'' into electrical signals on four conductors which represent in sequence the binary coded decimal signals corresponding with embossed numeric characters on a card passed through the card reader. The spring fingers A' through G' and ST', and the cooperating switch wires A'' through G'' and St'', are shown on the left side of FIG. 6. A +5 volt supply (not shown) has one terminal connected to a bus 50 and another terminal connected to a ground return line 48. The power supply and the switches are connected in conventional circuits using resistors and capacitors to minimize arcing during the making and breaking of contacts. The switches are connected to inputs of two BCD-decimal decoders 51 and 52, which are commercially available integrated circuits easily adapted (by utilizing some of the ten output terminals) for decoding the combinations of switch positions resulting from the reading of embossed characters.

The output of the decoders 51 and 52 are connected to inputs of thirteen inverters 54 each having designated outputs. Thirteen gates 56 are labelled to indicate input connections to the outputs of inverters 54, and have labelled individual outputs. Four OR gates 57 have labelled inputs connected to outputs of gates 56, and have four outputs connected to inputs of four respective clocked output AND gates 59. The output AND gates 59 are enabled in response to a pulse supplied over line 58 from a commonly available monostable multivibrater or one-shot integrated circuit 60.

The one-shot circuit 60 has a trigger input connected to the strobe spring finger ST' and the strobe switch wire ST''. The one-shot integrated circuit 60 provides a single output pulse on output lead 58 whenever the strobe switch contacts change from the open-circuit condition to the closed-circuit condition. At this moment, the spring fingers are in the positions represented in FIG. 3. The resulting strobe pulse on lead 58 is used to inable the AND gates 59 and provide on the four output leads thereof (having binary values 1, 2, 4 and 8) the binary coded decimal signal representations of the raised or embossed numeric character on the credit card just then passing underneath the sensing spring fingers of the card reader head.

An additional error detecting gate 62 is included and provided with input connections from outputs of specific labelled ones of the thirteen gates 56. An output signal on the output lead 64 of OR gate 62 is an indication that an error has occurred in the operation of the system and that immediate corrective maintenance is required. An error signal is provided at 64, whenever the decoder senses one or more additional closures of the segments switches than needed to configure a valid numeric character, and whenever an insufficient number of segments switches close to configure a valid character, for example an error signal is provided at 64 when the decoder indicates the sensing of the segments of the character "9" and also at the same time an incorrect sensing of a signal from the segment D of the character. An error is also indicated when the segments of the character "3" are sensed and there is also an erroneous sensing of the segment F under spring finger F'.

The error output lead 64 is connected to the inputs of gates 57 to produce a coded error indication at the outputs of the four output gates 59. That is, an error is indicated by output signals simultaneously provided from all four output gates 59. This error code 1111 is distinct from the codes 0000 through 1001 used to represent numbers 0 through 9, and it is interpreted and used in any desired manner by logic circuits (not shown) which may be connected to receive the output signals.

It is seen that, in the operation of the card reader, the passing of a raised embossed letter on a card underneath the cluster of spring fingers A' through G' results in the closing of certain ones of the spring finger switches. Since all of the characters include some segment along the bottom or base line of the characters, the strobe spring finger ST' is raised up by this bottom portion of the character, and this results in the opening of the normally-closed switch constituted by spring finger ST' and switch wire ST''. When the moving raised character reaches the point where the offset spring finger ST' falls off the raised bottom portion of the raised character, the switch contacts ST' and ST'' are closed. This timing switch closing is used to determine the time for electrically sensing the positions of the other switches, which are then perfectly registered with the various seven possible segments of the raised characters. An electrical coded output is then provided from the gates 59 to indicate the embossed number which has been sensed on the card. The card is all the while being constantly moved through the card reader, and the next and following numbers on the card are similarly sensed and translated to output electrical signals provided at times determined by the timing switch ST', St''.

It should be noted that the card reader accomplishes the strobed read-out of the characters without reliance upon any synchronizing or strobing indicia or protrusions provided on the card especially for that purpose. The strobing is accomplished in a novel manner utilizing means to sense solely the segments of the raised numeric characters themselves. The described construction is thus almost universally applicable to existing credit cards without the necessity of reissuing the credit cards with read-out synchronizing means added thereto.

Various modifications to the described card reader can be made without departing from the spirit and scope of the invention. For example, sensing fingers and electronics may be arranged to sense the recessed numbers accessible from the back side of a credit card, rather than sensing the identical raised numbers on the front side of the card.

What is claimed is:

1. A record card reader for sequentially sensing a row of embossed characters on the card, comprising
    a cluster of electrical switches with spring fingers arranged in a pattern corresponding with respective possible segments in said characters,
    means for the guided movement of the embossed characters on said record card relative to said spring fingers,
    a timing electrical switch with a spring finger located in the path of a segment included in all of said embossed characters, and having an offset trailing location to cause the timing switch to be operated at the moment when the electrical switch spring fingers of said cluster are registered with the possible segments of a character, and
    means responsive to the operation of said timing switch to utilize the then-existing condition of said cluster of electrical switches to electrically represent an embossed character.

2. A record card reader as defined in claim 1 wherein said electrical switch spring fingers in said cluster are arranged in a pattern registered with the three horizontal segments and the four vertical segments of the number 8 in a numeric character font.

3. A record card reader as defined in claim 2 wherein the spring fingers for the two left side vertical segments extend from a first common conductive plate, the spring fingers for the three horizontal segments extend from a second common conductive plate, and the spring fingers for the two right side vertical segments and the timing spring finger extend from a third common conductive plate, said timing spring finger being shorter than the spring fingers for the two right side vertical segments.

4. A card reader as defined in claim 3 wherein the electrical switches of said cluster include stationary conditions extending parallel to respective spring fingers and spaced to be contacted by said spring fingers when urged there against by segments of embossed character.

5. A card reader as defined in claim 4 wherein said timing switch includes a stationary conductor extending generally parallel to the timing switch spring finger and being formed to normally contact said timing switch spring finger.

6. A card reader as defined in claim 1 wherein the means responsive to the operation of the timing switch translates the then-existing conditions of the switches in said cluster to a corresponding binary coded decimal representation of the numeric character on four output conductors.

7. A record card reader for scanning and sequentially sensing a row of embossed numbers represented in a stylized font such as the Farrington 7B character font, comprising
    a cluster of seven normally open electrical switches actuated by spring fingers having sensing ends arranged in a pattern corresponding with the three horizontal segments and the four vertical segments of the number 8 in said character font,
    means for the guided movement of the embossed numbers on said record card relative to the sensing ends of said spring fingers, so that individual ones of said normally open switches are closed when embossed portions of a number are under the sensing ends of corresponding spring fingers,
    a normally closed timing electrical switch actuated by a spring finger having a sensing end located in the path of the lower horizontal segment of said embossed numbers, and having an offset trailing location to cause the switch to be opened at the moment when the sensing ends of the seven spring fingers are registered with seven possible segments of a number, and
    means responsive to the opening of said timing switch to utilize the open and/or closed conditions of said seven switches to represent the raised number just then passing under the sensing ends of the spring fingers.

* * * * *